United States Patent Office 3,336,364
Patented Aug. 15, 1967

3,336,364
DI(ALLYLOXYMETHYL)BUTYL BIS ESTERS
Dale Robert Dill, Webster Groves, Mo., assignor to Monsanto Company, St. Louis, Mo., a corporation of Delaware
No Drawing. Filed May 19, 1964, Ser. No. 368,683
10 Claims. (Cl. 260—475)

This invention relates to a new class of chemical compounds. More particularly, this invention relates to novel di(allyloxymethyl)butyl bis esters. These compounds have been found to be useful as plasticizers for vinyl halide-containing resins.

The novel di(allyloxymethyl)butyl bis esters have the general formula,

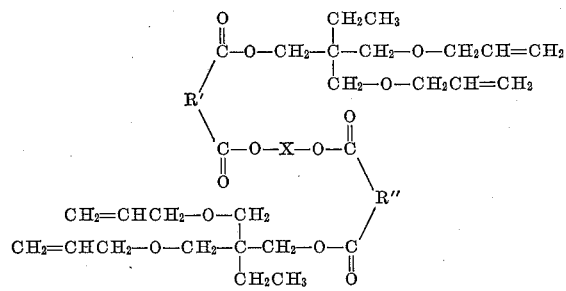

wherein X is a divalent radical selected from the group consisting of:

(a) alkylene of 1 to 20 carbon atoms;
(b) alkyleneoxyalkylene of 1 to 20 carbon atoms;
(c) xylylene;
(d) 2-butenylene; and
(e) a radical of the formula

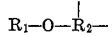

$R_1$ is alkyl of 2 to 4 carbon atoms;
$R_2$ is alkylene of 2 to 4 carbon atoms; and
R' and R" are each selected from the group consisting of phenylene, alkyl substituted phenylene of 7–16 carbon atoms, halophenylene, nitrophenylene, cyclohexenylene, naphthylene, ethylene, trimethylene, alkyl substituted ethylene of 3 to 12 carbon atoms, alkenyl substituted ethylene of 7 to 14 carbon atoms, vinylene, chlorovinylene, bromovinylene, 1-isopropenylene and 3-isopropenylene.

It is a primary object of this invention to provide novel di(allyloxymethyl)butyl bis esters.

A further object is to provide a novel class of di(allyloxymethyl)butyl bis esters which are useful as plasticizers for vinyl halide-containing resins.

Other and different objects, features and advantages of the invention will become apparent to those skilled in the art upon consideration of the following detailed description thereof and the examples attendant thereto.

It has been found that the heretofore described di(allyloxymethyl)butyl bis esters can be readily prepared by heating, at a temperature of from about 50° C. to about 200° C., a polycarboxylic acid anhydride, 1,1,1-trimethylol propane diallyl ether, a tertiary amine and an organic dihalide, in molar quantities of the ratio of about 2:2:2:1.

The polycarboxylic acid anhydrides useful in the preparation of the novel compounds of this invention include succinic anhydride, substituted succinic anhydride such as propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, α,β-diethylsuccinic anhydride, tetrapropenylsuccinic anhydride and the like; glutaric anhydride; maleic anhydride; substituted maleic anhydrides such as chloromaleic anhydride, dichloromaleic anhydride and the like; itaconic anhydride, citraconic anhydride; aconitic anhydride, tetrahydrophthalic anhydride, phthalic anhydride; methyltetrahydrophthalic anhydride, hexachloroendomethylenetetrahydrophthalic anhydride, substituted phthalic anhydrides such as tetrachlorophthalic anhydride, tetrabromophthalic anhydride, tetraiodophthalic anhydride, 4-nitrophthalic anhydride, methylphthalic anhydride, ethylphthalic anhydride, propylphthalic anhydride, butylphthalic anhydride and the like; and naphthalic anhydrides such as 1,2-naphthalic anhydride, 1,8-naphthalic anhydride, 2,3-naphthalic anhydride and the like. Other dicarboxylic acid anhydrides useful in the preparation of polymerizable compositions include the Diels-Alder adducts of maleic acid and aliphatic compounds having conjugated double bonds.

Tertiary amines suitable for use in preparing the compounds of this invention can be represented by the formula,

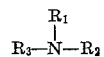

wherein $R_1$, $R_2$ and $R_3$ are like or unlike saturated aliphatic radicals. Preferably, $R_1$, $R_2$ and $R_3$ have a total of 3 to 24 carbon atoms, and it is also preferred that $R_1$, $R_2$ and $R_3$ be alkyl radicals. Non-limiting examples of such tertiary amines are trimethylamine, triethylamine, tri-n-propylamine, triisopropylamine, tri-n-butylamine, triisoamylamine, trihexylamine, triethanolamine, methyldiethylamine, dimethylethylamine, methyldiethanolamine, dimethylethanolamine, dimethylcyclohexylamine, dimethylhexylamine, dimethyldecylamine and the like.

The organic dihalide reactants of this invention include dihaloalkanes, aliphatic dihaloethers, dihaloxylenes and dihaloalkenes.

The dihaloalkane reactant of this invention can be represented by $R_4Z_2$, where $R_4$ is a straight or branched chain alkylene radical containing up to 20 carbon atoms, and Z is a halogen atom such as chlorine, bromine or iodine.

As illustrative of the dihaloalkane reactants of this invention are dichloromethane, dibromomethane, diiodomethane, 1,2 - dichloroethane, 1,2 - dibromoethane, 1,3-dibromopropane, 1,3 - diiodopropane, 1 - chloro - 3-bromopropane, 1 - iodo - 3 - chloropropane, 1,3-dichlorobutane, 2,3 - dichlorobutane, 1,4 - dichlorobutane, 1,4-diiodobutane, 1 - bromo - 4 - chlorobutane, 1 - iodo-3-chlorobutane, 1 - iodo - 4 - chlorobutane, 1,3 - dichloropentane, 1,4 - dichloropentane, 1,5 - dichloropentane, 1,5-dibromopentane, 2,3 - dibromopentane, 1 - bromo-5-chloropentane, 1 - iodo - 3 - chloropentane, 1,1 - dichloro-3-methylbutane, 1,3 - dibromo-2,2-dimethylbutane, 1,6-dichlorohexane, 1,2 - dichlorohexane, 1,5-dichlorohexane, 1,2 - dibromohexane, 1,4 - dibromohexane, 1,4 - diiodohexane, 1,6 - dibromohexane, 1,6 - diiodohexane, 2,3-dibromohexane, 2,5-dibromohexane, 3,4-dichlorohexane, 3,4 - dibromohexane, 1,3 - dibromo - 2 - methylpentane, 1,2 - dibromo - 3 - methylpentane, 1,5-dibromo-3-methylpentane, 1,2 - dibromo - 4 - methylpentane, 1,2-dichloro-3,3 - dimethylbutane, 1,1 - dichloroheptane, 1,4-dibromoheptane, 1,7 -dibromoheptane, 1,7 - dichloroheptane, 1,5-dichloro - 3,3 - dimethylpentane, 3 - methyl - 2,4 - dibromohexane, 1,2 - dichloro - 3,4 - dimethylpentane, 1,3-bromo - 2 - diethylpropane, 1,8 - dichlorooctane, 1,4-dibromooctane, 1,8 - dibromooctane, 1,6 - dichlorooctane, 1,7 - dichlorooctane, 3 - isopropyl-1,5-dibromopentane, 1,9 - dichlorononane, 1,9 - dibromononane, 1,2 - dichlorononane, 1 - chloro - 9 - iodononane, 1,10 - dichlorodecane, 1,10 - dibromodecane, 1,12 - dichlorododecane, 1,12 - dibromododecane, 1,14 - dibromotetradecane, 1,18-dibromooctadecane, 1,18 - dichlorooctadecane and 1,20-dibromoeicosane.

Typical utilizable aliphatic dihaloethers include α,α'-dichlorodiethyl ether, β,β'-dichlorodiethyl ether, β,β'-dibromodiethyl ether, β,β' - diiododiethyl ether, 1,3 - dichloropropyl ethyl ether, α,β-dibromoethyl - n - propyl ether, α,β-dibromopropyl ethyl ether, α,β-dibromoethyl-n-butyl ether, α,β-dibromo-n-butyl ethyl ether, α,β-dibromoisobutyl ethyl ether, 4,4'-dichlorodibutyl ether, 4,4'-dichlorodibutyl ether and 4,4'-dichlorodiamyl ether.

Dihaloxylenes which can be used in preparing the compounds of this invention include α,α'-dibromoxylene.

The dihaloalkenes which are useful in preparing the compounds of this invention include 1,4-dichlorobutene-2 and 1,4-dibromobutene-2.

The invention will be more readily understood by reference to the following examples which describe the detailed preparation of representative compounds. There are, of course, many other forms of this invention which will become obvious to one skilled in the art once the invention has been fully disclosed, and it will accordingly be recognized that these examples are given for the purpose of illustration only, and are not to be construed as limiting the scope of this invention in any way.

Example 1

To a suitable reaction vessel having means for the addition and removal of heat, means for measuring the temperature of the reaction mass, means for agitating the reaction mass, means for the addition and removal of solids and liquids and fitted with a condenser, there is charged 148.1 grams (1.0 mol) of phthalic anhydride and 226.0 grams (1.05 mols) of 1,1,1-trimethylolpropane diallyl ether. The mixture is heated to about 110° C., and 106.5 grams (1.05 mols) of triethylamine is added. There is then added 103.0 grams (0.48 mol) of 1,3-dibromobutane. The resultant reaction mixture is held at a temperature of about 135° C. for about two hours and then washed with several water and lye washes. The oil layer from the washing step is steam sparged and dehydrated at 120° C. at 20 mm. Hg for about two hours. There is obtained 293.5 grams of 1,3-butanediol bis[2,2-di(allyloxymethyl)butyl phthalate].

Example 2

Following the procedure of Example 1, 148.1 grams (1.0 mol) of phthalic anhydride, 226.0 grams (1.05 mols) of 1,1,1-trimethylolpropane diallyl ether, 106.0 grams (1.05 mols) of triethylamine and 100 grams (0.33 mol) of 1,10 - dibromodecane are utilized to prepare 1,10-decamethylene bis [2,2-di(allyloxymethyl)butyl phthalate] in good yield.

Example 3

Following the procedure of Example 1, 132.5 grams (1.0 mol) of chloromaleic anhydride, 226.0 grams (1.05 mols) of 1,1,1 - trimethylolpropane diallyl ether, 106.0 grams (1.05 mols) of triethylamine and 57.2 grams (0.45 mol) of 1,1-dichlorobutane are utilized to prepare 1,1-butanediol bis [2,2 - di(allyloxymethyl)butyl chloromaleate] in excellent yield.

Example 4

Following the procedure of Example 1, 112.08 grams (1.0 mol) of itaconic anhydride, 226.0 grams (1.05 mols) of 1,1,1 - trimethylolpropane diallyl ether, 106.0 grams (1.05 mols) of triethylamine and 38.2 grams (0.45 mol) of dichloromethane are utilized to prepare methylene bis [2,2 - di(allyloxymethyl)butyl itaconate] in high yield.

Example 5

A suitable reaction vessel is charged with 300 grams (3.0 mols) of succinic anhydride, 576.0 grams (3.1 mols) of 1,1,1-trimethylolpropane diallyl ether, 333.0 grams (3.3 mols) of triethylamine and 200 grams (1.4 mols) of β,β'-dichloroethyl ether. The mixture is heated to about 125° C. and held at this temperature for about one hour. The reaction mixture is then washed several times with water and aqueous sodium carbonate washes. The oil layer from the washing step is steam sparged and dehydrated under vacuum. There is obtained 422.0 grams of 3-oxa-1,5-pentamethylene bis [2,2 - di(allyloxymethyl)butyl succinate].

Examples 6–8

Following the procedure of Example 1, 1.0 mol of each of the anhydrides tabulated below is substituted for the phthalic anhydride. The product obtained in each instance is as indicated.

(6) Anhydride=tetrapropenyl succinic anhydride. Product=1,3 - butanediol bis [2,2 - di(allyloxymethyl) butyl tetrapropenyl succinate].

(7) Anhydride=chlorophthalic anhydride. Product=1, 3 - butanediol bis [2,2 - di(allyloxymethyl)butyl chlorophthalate].

(8) Anhydride=1,8-naphthalic anhydride. Product=1, 3 - butanediol bis [2,2 - di(allyloxymethyl)butyl - 1,8-naphthalate].

Example 9

Following the procedure of Example 1, 148.1 grams (1.0 mol) of phthalic anhydride, 226.0 grams (1.05 mols) of 1,1,1-trimethylolpropane diallyl ether, 106.0 grams (1.05 mols) of triethylamine and 78.7 grams (0.45 mol) of α,α'-dichloroxylene are utilized to prepare α,α'-xylylene bis [2,2-di(allyloxymethyl)butyl phthalate] in good yield.

Examples 10–13

Following the procedure of Example 1, 1.00 mol of polycarboxylic acid anhydride and 0.45 mol of dihaloalkane are substituted, as tabulated below, for the like constituents of said example. The product obtained in each instance is as indicated.

(10) Anhydride = citraconic anhydride. Dihaloalkine=1,4 - dichlorobutane. Product=1,4 - tetramethylene bis [2,2-di(allyloxymethyl)butyl citraconate].

(11) Anhydride=4-nitrophthalic anhydride. Dihaloalkane=1,5 - diiodopentane. Product=1,5 - pentamethylene bis [2,2-di(allyloxymethyl)butyl-4-nitrophthalate].

12. Anhydride=methylphthalic anhydride. Dihaloalkane=1,2-dichloroethane. Product=1,2-ethylene bis [2,2-di(allyloxymethyl)butyl methylphthalate].

(13) Anhydride=tetrahydrophthalic anhydride. Dihaloalkane=1,4-dibromobutane. Product=1,4-tetramethylene bis [2,2-di(allyloxymethyl)butyl tetrahydrophthalate].

Example 14

A suitable reaction vessel is charged with 342.0 grams (3.0 mols) of glutaric anhydride and 576.0 grams (3.1 mols) of 1,1,1-trimethylolpropane diallyl ether. The mixture is heated to about 105° C., and 333.0 grams (3.3 mols) of triethylamine is added. There is then added 178.0 grams (1.4 mols) of 1,4-dichlorobutane. The reaction mixture is held at a temperature of about 130° C. for about seven hours and then washed several times with water and aqueous sodium carbonate washes. The reaction mixture is then steam sparged and dehydrated under vacuum. There is obtained 251.0 grams of 1,4-tetramethylene bis [2,2-di(allyloxymethyl)butyl glutarate].

Example 15

In the manner of Example 1, 108.0 grams (1.01 mols) of maleic anhydride, 226.0 grams (1.05 mols) of 1,1,1-trimethylolpropane diallyl ether, 118.0 grams (1.17 mols) of triethylamine and 100.0 grams (0.46 mol) of 1,4-dibromobutane are utilized to prepare 1,4-tetramethylene bis [2,2-di(allyloxymethyl)butyl maleate] in excellent yield.

Example 16

A suitable reaction vessel is charged with 300 grams (3.0 mols) of succinic anhydride and 576.0 grams (3.1 mols) of 1,1,1-trimethylolpropane diallyl ether. The mixture is heated to about 105° C., and 333.0 grams (3.3 mols) of triethylamine is added. There is then added 178.0 grams (1.4 mols) of 1,4-dichlorobutane. The reaction mixture is held at a temperature of about 125° C. for about six hours and then washed several times with water and lye washes. The reaction mixture is then steam sparged and dehydrated under vacuum. There is obtained 491.0 grams of 1,4-tetramethylene bis [2,2-di(allyloxymethyl)butyl succinate].

*Example 17*

A reaction vessel is charged with 98.06 grams (1.0 mol) of maleic anhydride, 226.0 grams (1.05 mols) of 1,1,1-trimethylolpropane diallyl ether and 2 ml. of thionyl chloride. After the mixture is allowed to react for about one hour, 106.0 grams (1.05 mols) of triethylamine and 100 grams (0.45 mol) of 1,4-dibromobutane are added. The reaction mixture is worked up in the manner described above, and there is obtained 1,4-tetramethylene bis [2,2-di(allyloxymethyl)butyl fumarate] in good yield.

*Example 18*

Following the procedure of Example 1, 148.1 grams (1.0 mol) of phthalic anhydride, 226.0 grams (1.05 mols) of 1,1,1-trimethylolpropane diallyl ether, 106.5 grams (1.05 mols) of triethylamine and 56.3 grams (0.45 mol) of 1,4-dichlorobutene-2 are utilized to prepare 1,4,2-butene-1,4-bis [2,2-di(allyloxymethyl)butyl phthalate] in good yield.

*Example 19*

Following the procedure of Example 1, 148.1 grams (1.0 mol) of phthalic anhydride, 226.0 grams (1.05 mols) of 1,1,1-trimethylolpropane diallyl ether, 106.5 grams (1.05 mols) of triethylamine and 106.0 grams (0.45 mol) of 1-bromo-7-chloroheptane are utilized to prepare 1,7-heptamethylene bis [2,2-di(allyloxymethyl)butyl phthalate] in high yield.

*Example 20*

Following the procedure of Example 1, 148.1 grams (1.0 mol) of phthalic anhydride, 226.0 grams (1.05 mols) of 1,1,1-trimethylolpropane diallyl ether, 106.0 grams (1.05 mols) of triethylamine and 118.0 grams (0.45 mol) of 1,8-dibromooctane are utilized to prepare 1,8 - octamethylene bis [2,2 - di(allyloxymethyl)butyl phthalate] in good yield.

*Example 21*

Following the procedure of Example 1, 74.05 grams (0.5 mol) of phthalic anhydride, 50.0 grams (0.5 mol) of succinic anhydride and 226.0 grams (1.05 mols) of 1,1,1-trimethylolpropane diallyl ether, 106.5 grams (1.05 mols) of triethylamine and 103.0 grams (0.48 mol) of 1,3-dibromobutane are utilized to prepare a reaction mixture of 1,3-butanediol bis [2,2-di(allyloxymethyl)butyl phthalate], 1,3-butanediol bis [2,2-di(allyloxymethyl)butyl succinate] and 1,3-butanediol [2,2-di(allyloxymethyl)butyl phthalate], [2,2-di(allyloxymethyl)butyl succinate] in good yield.

As previously stated, the products of this invention are useful as plasticizers for vinyl halide-containing polymers. The advantageous properties possessed by the esters of this invention will be more fully understood by reference to the following examples.

The following testing procedures are used in evaluating the physical properties of plasticizers.

*Compatibility.*—Visual inspection of the plasticized composition is employed, incompatibility of the plasticizer with the polymer being demonstrated by cloudiness and exudation of the plasticizer.

*Low-temperature flexibility.*—Low-temperature flexibility is one of the most important properties of elastomeric vinyl compositions. While many plasticizers will produce flexible compositions at room temperature, the flexibility of these compositions at low temperature may vary considerably; i.e., plasticized polyvinyl chloride compositions that are flexible at room temperature often become very brittle and useless at lower temperatures. Low-temperature flexibility tests employed herein are according to the Clash-Berg method. This method determines the torsional flexibility of a plastic at various temperatures. The temperatures at which the vinyl composition exhibits an arbitrarily established minimum flexibility is defined as the low-temperature flexibility of the composition. This value may also be defined as the lower temperature limit of the plasticized composition's usefulness as an elastomer.

*Volatility.*—A decrease in plasticizer concentration, when caused by volatilization of the plasticizer, often results in decreased flexibility of a plasticized polymer composition. Hence, plasticizers which are readily volatilized from the plasticized composition as a result of aging or heating are inefficient because, upon volatilization, the plasticized compositions become stiff and hard. The test for plasticizer volatility employed herein is that described by the American Society for Testing Materials under the designation D-1203-55T.

*Water resistance.*—The amount of water absorption and the amount of water leaching that take place when the plasticized composition is immersed in distilled water for 24 hours is determined.

*Kerosene extraction.*—Resistance to kerosene is measured as follows: A 2" diameter, 40 mil. disc is suspended in a 50° C. oven for a 3-hour conditioning period to eliminate water, then cooled and weighed. The conditioned sample is then immersed in 400 ml. of kerosene for a period of 24 hours at 23° C. The sample is then removed from kerosene, blotted dry and suspended in a forcedraft 80° C. oven for 4 hours. The sample is then cooled and weighed. The percent loss in weight is reported as the kerosene extraction value.

*Hardness.*—A standard instrument made by Shore Instrument Company is used for this determination and expresses the hardness in units from 1 to 100. The hardness of the composition is judged by its resistance to the penetration of a standard needle applied to the composition under a standard load for a standard length of time.

The following examples illustrate the advantageous and unexpected results which are achieved by the use of the esters of the present invention in vinyl halide-containing polymers, but it is not intended that the invention be limited by or to such examples.

*Example 22*

One hundred parts by weight of polyvinyl chloride and 60 parts by weight of 1,3-butanediol bis[2,2-di(allyloxymethyl)butyl phthalate] obtained in Example 1 are mixed on a rolling mill to a homogeneous blend. During the milling, substantially no fuming or discoloration is observed. Testing of the molded sheet for low-temperature flexibility, according to the procedure described above, gives a value of —4.4° C. A test of the volatility characteristics of the composition gives a value of 0.1%. Tests of the water resistance of the plasticized material show a loss of soluble matter of 0.11% and a 0.41% water absorption value. A test of the kerosene extraction characteristics of the composition gives a value of 0.1%. A Shore harness value of 86 is obtained on this composition.

*Example 23*

One hundred parts by weight of polyvinyl chloride and 60 parts by weight of 3-oxa-1,5-pentamethylene bis [2,2-(diallyloxymethyl)butyl succinate] obtained in Example 5 are mixed on a rolling mill to a homogeneous blend. During the milling, substantially no fuming or discoloration is observed. Testing of the molded sheet for low-temperature flexibility gives a value of 0.8° C. A test of the volatility characteristics of the composition gives a value of 0.4%. Tests of the water resistance of the plasticized material show a loss of soluble matter of 0.21% and a 1.40% water absorption value. A test of the kerosene extraction characteristics of the composition gives a value of 0.1%. A Shore hardness value of 92 is obtained on this composition.

*Example 24*

One hundred parts of polyvinyl chloride and 60 parts by weight of 1,4-tetramethylene bis [2,2-di(allyloxymethyl)butyl glutarate] obtained in Example 14 are mixed on a rolling mill to a homogeneous blend. During the milling, substantially no fuming or discoloration is observed. Testing of the molded sheet for low-temperature flexibility gives a value of −39.4° C. A test of the volatility characteristics of the composition gives a value of 1.0%. Tests of the water resistance of the plasticized material show a loss of soluble matter of 0.03% and a 0.56% water absorption value. A test of the kerosene extraction characteristics of the composition gives a value of 4.2%. A Shore hardness value of 72 is obtained on this composition.

Other compounds within the scope of this invention are found to possess properties of a similar nature.

While this invention has been described with respect to certain embodiments, it is not so limited, and it should be understood that variations and modifications may be made which are obvious to those skilled in the art without departing from the spirit or scope of the invention.

The embodiments of the invention in which an exclusive property or privilege is claimed are defined as follows:

1. A compound of the formula,

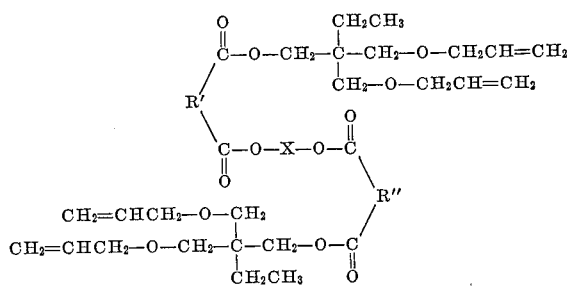

wherein X is a divalent radical selected from the group consisting of (a) alkylene of 1 to 20 carbon atoms;
(a) alkyleneoxyalkylene of 1 to 20 carbon atoms;
(c) xylylene;
(d) 2-butenylene; and
(e) a radical of the formula

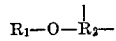

wherein:

$R_1$ is alkyl of 2 to 4 carbon atoms;
$R_2$ is alkylene of 2 to 4 carbon atoms; and
R′ and R″ are each selected from the group consisting of phenylene, alkyl substituted phenylene of 7–16 carbon atoms, halophenylene, nitrophenylene, cyclohexenylene, naphthylene, ethylene, trimethylene, alkyl substituted ethylene of 14 carbon atoms, vinylene, chlorovinylene, bromovinylene, 1-isopropenylene and 3-isopropenylene.

2. A compound of the formula,

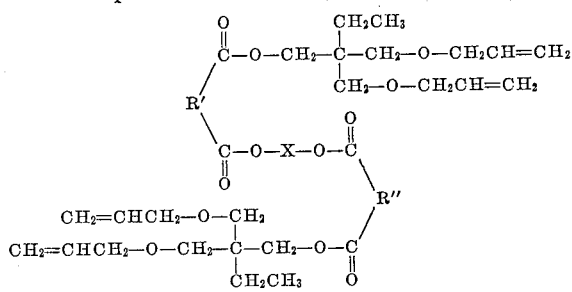

wherein X is a divalent radical selected from the group consisting of (a) alkylene of 1 to 20 carbon atoms;
(b) alkyleneoxyalkylene of 1 to 20 carbon atoms;
(c) xylylene;
(d) 2-butenylene; and
(e) a radical of the formula,

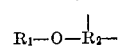

wherein:

$R_1$ is alkyl of 2 to 4 carbon atoms;
$R_2$ is alkylene of 2 to 4 carbon atoms; and
R′ and R″ are vinylene.

3. A compound of the formula,

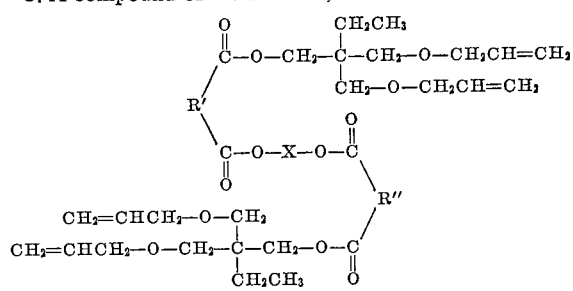

wherein X is a divalent radical selected from the group consisting of (a) alkylene of 1 to 20 carbon atoms;
(b) alkyleneoxyalkylene of 1 to 20 carbon atoms;
(c) xylylene;
(d) 2-butenylene; and
(e) a radical of the formula

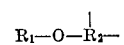

wherein:

$R_1$ is alkyl of 2 to 4 carbon atoms;
$R_2$ is alkylene of 2 to 4 carbon atoms; and
R′ and R″ are alkylene having 2 carbon atoms.

4. A compound of the formula,

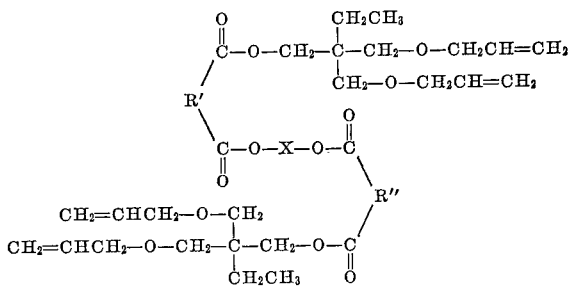

wherein X is a divalent radical selected from the group consisting of (a) alkylene of 1 to 20 carbon atoms;
(b) alkyleneoxyalkylene of 1 to 20 carbon atoms;
(c) xylylene; and
(d) 2-butenylene; and (e) a radical of the formula,

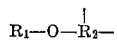

wherein:

R$_1$ is alkyl of 2 to 4 carbon atoms;
R$_2$ is alkylene of 2 to 4 carbon atoms; and
R' and R'' are phenylene.

5. 1,3 - butanediol bis [2,2 - di(allyloxymethyl)butyl phthalate].

6. 1,4-tetramethylene bis [2,2-di(allyloxymethyl)butyl succinate].

7. 1,4-tetramethylene bis [2,2-di(allyloxymethyl)butyl glutarate].

8. 3-oxa-1,5-pentamethylene bis [2,2-di(allyloxymethyl) butyl succinate].

9. 1,10-decamethylene bis [2,2-di(allyloxymethyl)butyl phthalate].

10. 1,4-tetramethylene bis [2,2-di(allyloxymethyl)butyl maleate].

No references cited.

LORRAINE A. WEINBERGER, *Primary Examiner.*

THOMAS L. GALLOWAY, *Assistant Examiner.*